US010569770B1

(12) United States Patent
You

(10) Patent No.: US 10,569,770 B1
(45) Date of Patent: Feb. 25, 2020

(54) DRIVER ASSISTANCE SYSTEM

(71) Applicant: MANDO CORPORATION, Pyeongtaek-Si, Gyeonggi-do (KR)

(72) Inventor: Kwan Sun You, Yongin-si (KR)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 16/216,574

(22) Filed: Dec. 11, 2018

(51) Int. Cl.
*B60W 30/09* (2012.01)
*B60W 30/095* (2012.01)

(52) U.S. Cl.
CPC ........ *B60W 30/09* (2013.01); *B60W 30/0956* (2013.01); *B60W 2420/52* (2013.01); *B60W 2550/306* (2013.01)

(58) Field of Classification Search
CPC ............. B60W 30/09; B60W 30/0956; B60W 2420/52; B60W 2550/306
USPC ........................................................ 701/301
See application file for complete search history.

(56) References Cited

U.S. PATENT DOCUMENTS

| 8,676,443 | B2 | 3/2014 | Han et al. | |
|---|---|---|---|---|
| 9,701,307 | B1* | 7/2017 | Newman | B60Q 9/008 |
| 10,235,882 | B1* | 3/2019 | Aoude | G08G 1/005 |
| 2009/0192710 | A1* | 7/2009 | Eidehall | B62D 15/0265 |
| | | | | 701/301 |
| 2014/0049646 | A1* | 2/2014 | Nix | B60R 1/002 |
| | | | | 348/148 |
| 2014/0309884 | A1* | 10/2014 | Wolf | B60T 8/17 |
| | | | | 701/41 |
| 2015/0112504 | A1* | 4/2015 | Binion | G06Q 40/08 |
| | | | | 701/1 |
| 2015/0112730 | A1* | 4/2015 | Binion | G07C 5/008 |
| | | | | 705/4 |

(Continued)

FOREIGN PATENT DOCUMENTS

KR    10-1834351 B    3/2018

OTHER PUBLICATIONS

Kyuwon Kim, et al., Hyundai Motor Company, R&D Division, "Design of Integrated Risk Management-Based Dynamic Driving Control of Automated Vehicles", IEEE Intelligent Transportation Systems Magazine, Apr. 1, 2017, pp. 57-73, vol. 9, No. 1.

(Continued)

*Primary Examiner* — Atul Trivedi
(74) *Attorney, Agent, or Firm* — Morgan, Lewis & Bockius LLP

(57) ABSTRACT

A driver assistance system (DAS) for a vehicle avoids collision between a vehicle and a preceding object using emergency steering of the vehicle. The DAS includes forward-view sensors and a corner sensor mounted to a vehicle. A controller is provided with a processor to process the forward-view image data, the forward-view sensing data, and the side-view sensing data. The controller detects both a preceding object located in a region forward of the vehicle and a side object located in a region on the side of the vehicle in response to a result of processing the forward-view image data, the forward-view sensing data, and the side-view sensing data. In response to a collision between the vehicle and the preceding object being predicted and the region on the side of the vehicle being free of the side object, the controller outputs a steering signal to a steering device of the vehicle.

25 Claims, 14 Drawing Sheets

(56) References Cited

U.S. PATENT DOCUMENTS

| | | | |
|---|---|---|---|
| 2015/0112731 A1* | 4/2015 | Binion | G06Q 40/08 705/4 |
| 2015/0232034 A1* | 8/2015 | Weller | B60R 1/12 348/148 |
| 2015/0232090 A1 | 8/2015 | Jeon et al. | |
| 2015/0336547 A1* | 11/2015 | Dagan | B60T 7/22 701/70 |
| 2016/0001781 A1* | 1/2016 | Fung | B60W 40/08 701/36 |
| 2016/0039358 A1* | 2/2016 | Okuda | B60W 30/143 348/148 |
| 2016/0193971 A1* | 7/2016 | Yellambalase | B60R 1/00 348/148 |
| 2016/0193997 A1* | 7/2016 | Yellambalase | B60W 30/08 701/36 |
| 2016/0193998 A1* | 7/2016 | Yellambalase | B60W 30/08 348/148 |
| 2016/0196748 A1* | 7/2016 | Yellambalase | B60R 11/04 340/435 |
| 2016/0196823 A1* | 7/2016 | Yellambalase | G10L 15/22 348/148 |
| 2016/0339959 A1* | 11/2016 | Lee | B62D 15/0265 |
| 2017/0066440 A1* | 3/2017 | Koravadi | B60T 7/12 |
| 2017/0098131 A1* | 4/2017 | Shashua | G06K 9/00805 |
| 2017/0154241 A1* | 6/2017 | Shambik | B60R 1/00 |
| 2017/0210383 A1 | 7/2017 | Nishimura | |
| 2017/0247030 A1* | 8/2017 | Rinaldo | B60W 10/20 |
| 2017/0287233 A1* | 10/2017 | Nix | G07C 5/008 |
| 2018/0015918 A1* | 1/2018 | Bae | B60W 10/04 |
| 2018/0284234 A1* | 10/2018 | Curatu | G01S 7/4817 |
| 2018/0299900 A1* | 10/2018 | Bae | G05D 1/0238 |
| 2018/0345978 A1* | 12/2018 | Fujii | B60W 30/18163 |
| 2018/0346026 A1* | 12/2018 | Fujii | B62D 15/025 |
| 2018/0346027 A1* | 12/2018 | Fujii | B62D 15/025 |
| 2018/0348752 A1* | 12/2018 | Sakamoto | G05D 1/0055 |
| 2018/0370527 A1* | 12/2018 | Rachor | B60W 30/09 |
| 2019/0069051 A1* | 2/2019 | Al-Stouhi | H04Q 9/00 |
| 2019/0069052 A1* | 2/2019 | Al-Stouhi | G07C 5/008 |
| 2019/0077402 A1* | 3/2019 | Kim | B60W 30/0956 |
| 2019/0106108 A1* | 4/2019 | Wienecke | B60W 30/12 |
| 2019/0325754 A1* | 10/2019 | Aoude | G08G 1/052 |

OTHER PUBLICATIONS

Extended Search Report issued in corresponding European Application No. 18214289.3, dated Jun. 28, 2019.

* cited by examiner

DRIVER ASSISTANCE SYSTEM

CROSS-REFERENCE TO RELATED APPLICATION

This application is based on and claims priority under 35 U.S.C. § 119 to Korean Patent Application No. 10-2018-0128009, filed on Oct. 25, 2018 in the Korean Intellectual Property Office, the disclosure of which is incorporated by reference in its entirety.

BACKGROUND

1. Field

Embodiments of the present disclosure relate to a driver assistance system, and more particularly to an advanced driver assistance system (ADAS) configured to perform forward collision avoidance.

2. Description of the Related Art

In general, a vehicle is a machine which travels on roads or tracks using fossil fuels, electricity, etc. Vehicles may move in various directions according to rotation of at least one wheel mounted to a vehicle body. Such vehicles may include, for example, a three-wheeled or four-wheeled vehicle, a two-wheeled vehicle such as a motorcycle, a motorized bicycle, construction equipment, a bicycle, a train traveling on rails, and the like.

The number of users who use vehicles as simple transportation means in modern society is rapidly increasing. With rapid development of vehicle technology, users or people who use vehicles can easily enjoy long distance travel, resulting in a high standard of living in daily life. However, within areas with high population density, such as Korea, road traffic situations may be seriously deteriorated such that traffic congestion becomes more serious day by day.

In recent times, in order to mitigate driver difficulty as well as to increase driver's convenience during vehicle driving, many developers and companies are conducting intensive research into a vehicle provided with an advanced driver assistance system (ADAS), such that the ADAS-embedded vehicle can actively provide the driver with various kinds of information, for example, vehicle states, driver's states, peripheral environment information, etc.

A representative example of the ADAS embedded in the vehicle may include a Forward Collision Avoidance (FCA) system, an Autonomous Emergency Brake (AEB) system, a Driver Attention Warning (DAW) system, etc. The ADAS may determine the degree of possibility of collision between a host vehicle provided with the ADAS and another object (or a peripheral vehicle) during driving of the host vehicle. If there is a high possibility of collision between the host vehicle and other vehicles, the ADAS may allow the host vehicle to perform emergency braking, such that the host vehicle can avoid collision between the host vehicle and another vehicle, and can also provide a warning message to a driver of the host vehicle.

However, the conventional ADAS-embedded vehicle designed to perform only emergency braking has difficulty in efficiently avoiding collision with another object.

SUMMARY

Therefore, it is an aspect of the present disclosure to provide a driver assistance system configured to avoid collision between a vehicle and a preceding object using emergency steering of the vehicle, and a method for controlling the same.

Additional aspects of the disclosure will be set forth in part in the description which follows and, in part, will be obvious from the description, or may be learned by practice of the disclosure.

In accordance with an aspect of the present disclosure, a driver assistance system (DAS) includes a first forward-view sensor having an image sensor mounted to a vehicle, having a field of view (FOV) including a region forward of the vehicle, and configured to acquire forward-view image data; a second forward-view sensor having at least one of a radar sensor or a Light Detection And Ranging (LiDAR) sensor mounted to the vehicle, having a field of sensing (FOS) including the region forward of the vehicle, and configured to acquire forward-view sensing data; a corner sensor having at least one of a radar sensor or a LiDAR sensor, mounted to the vehicle, having a field of sensing (FOS) including a region on a side of the vehicle, and configured to acquire side-view sensing data; and a controller provided with a processor configured to process the forward-view image data, the forward-view sensing data, and the side-view sensing data. The controller detects both a preceding object located in the region forward of the vehicle and a side object located in the region on the side of the vehicle in response to a result of processing the forward-view image data, the forward-view sensing data, and the side-view sensing data. In response to a collision between the vehicle and the preceding object being predicted and the region on the side of the vehicle being free of the side object, the controller outputs a steering signal to a steering device of the vehicle.

In response to the collision between the vehicle and the preceding object being predicted after outputting the steering signal, the controller may output a brake signal to a brake device of the vehicle.

In response to the collision between the vehicle and the preceding object being predicted and the side object being detected, the controller may output a brake signal to a brake device of the vehicle.

In response to the collision between the vehicle and the preceding object being predicted and collision between the vehicle and the side object being predicted, the controller may output a brake signal to a brake device of the vehicle.

In response to the collision between the vehicle and the preceding object being predicted and the region on the side of the vehicle being free of the side object, the controller may output the steering signal to the steering device of the vehicle to change a traveling direction of the vehicle to another direction that is free of the side object.

In response to the result of processing the forward-view image data, the forward-view sensing data, and the side-view sensing data, the controller may determine both a distance between the vehicle and the preceding object and a relative speed of the preceding object with respect to the vehicle.

The controller may predict a possibility of collision between the vehicle and the preceding object based on the distance between the vehicle and the preceding object and the relative speed of the preceding object with respect to the vehicle.

In accordance with another aspect of the present disclosure, a driver assistance method includes acquiring forward-view image data of a vehicle by a camera mounted to the vehicle and having a field of view (FOV) including a region forward of the vehicle; acquiring forward-view sensing data of the vehicle by at least one of a forward-view radar or a forward-view Light Detection And Ranging (LiDAR) sensor mounted to the vehicle and having a field of sensing (FOS) including the region forward of the vehicle; acquiring side-view sensing data of the vehicle by at least one of a corner radar or a corner LiDAR mounted to the vehicle and having a field of sensing (FOS) including a region on a side of the vehicle; processing the forward-view image data, the forward-view sensing data, and the side-view sensing data to detect both a preceding object located in the region forward of the vehicle and a side object located in the region on the side of the vehicle; and in response to a collision between the vehicle and the preceding object being predicted and the region on the side of the vehicle being free of the side object, changing a traveling direction of the vehicle to another direction.

In response to the collision between the vehicle and the preceding object being predicted after changing the traveling direction of the vehicle to the other direction, braking of the vehicle may be performed.

In response to the collision between the vehicle and the preceding object being predicted and the side object being detected, braking of the vehicle may be performed.

In response to the collision between the vehicle and the preceding object being predicted and a collision between the vehicle and the side object being predicted, braking of the vehicle may be performed.

The changing the traveling direction of the vehicle may include changing the traveling direction of the vehicle towards a side direction that is free of the side object.

The predicting of the collision between the vehicle and the preceding object may include determining a distance between the vehicle and the preceding object and a relative speed of the preceding object with respect to the vehicle.

The predicting of the collision between the vehicle and the preceding object further may include predicting a possibility of collision between the vehicle and the preceding object based on the distance between the vehicle and the preceding object and the relative speed of the preceding object with respect to the vehicle.

In accordance with an aspect of the present disclosure, a driver assistance system (DAS) includes a first forward-view sensor including an image sensor mounted to a vehicle, having a field of view (FOV) including a forward direction of the vehicle, and configured to acquire forward-view image data; a second forward-view sensor comprising at least one of a radar sensor or a Light Detection And Ranging (LiDAR) sensor, mounted to the vehicle, having a field of sensing (FOS) including the forward direction of the vehicle, and configured to acquire forward-view sensing data; a corner sensor comprising at least one of a radar sensor or a LiDAR sensor, mounted to the vehicle, having a field of sensing (FOS) including a side direction of the vehicle, and configured to acquire side-view sensing data; and a controller provided with a processor configured to process the forward-view image data, the forward-view sensing data, and the side-view sensing data. The controller is configured to detect both a preceding object located in the forward direction of the vehicle and a side object located in the side direction of the vehicle based on processing of the forward-view image data, the forward-view sensing data, and the side-view sensing data. In response to a collision between the vehicle and the preceding object being predicted and no collision between the vehicle and the side object being predicted, the controller outputs a steering signal to a steering device of the vehicle.

In response to the collision between the vehicle and the preceding object being predicted and a collision between the vehicle and the side object being predicted, the controller may output a brake signal to a brake device of the vehicle.

In response to the collision between the vehicle and the preceding object being predicted and no side object being detected in the side direction of the vehicle, the controller may output to a steering device of the vehicle a steering signal to change a traveling direction of the vehicle to another direction in which no side object is detected.

In response to a result of processing the forward-view image data, the forward-view sensing data, and the side-view sensing data, the controller may determine a distance between the vehicle and the preceding object and a relative speed of the preceding object with respect to the vehicle, and predict a possibility of collision between the vehicle and the preceding object based on the distance between the vehicle and the preceding object and the relative speed of the preceding object.

In accordance with an aspect of the present disclosure, a driver assistance system (DAS) for a vehicle having a steering system includes a forward-view sensor mounted to the vehicle and configured to sense a region forward of the vehicle and provide forward-view sensing data; a side-view sensor mounted to the vehicle and configured to sense a region on a side of the vehicle and provide side-view sensing data; and a processor communicatively connected to the forward-view sensor and the side-view sensor to receive both the forward-view sensing data and the side-view sensing data. The processor is configured to output a steering signal for the steering system of the vehicle in response to detecting a preceding object in the region forward of the vehicle based on the forward-view sensing data and detecting an area free of a side object in the region on the side of the vehicle based on the side-view sensing data.

The forward-view sensor mounted to the vehicle may include at least one of an image sensor, a radar sensor, or a Light Detection And Ranging (LiDAR) sensor configured to sense the region forward of the vehicle and provide the forward-view sensing data, and the side-view sensor mounted to the vehicle may include at least one of a radar sensor or a Light Detection And Ranging (LiDAR) sensor configured to sense the region on the side of the vehicle and provide the side-view sensing data.

The forward-view sensor mounted to the vehicle may include the image sensor and at least one of the radar sensor or the Light Detection And Ranging (LiDAR) sensor, and the forward-view sensor may be configured to sense the region forward of the vehicle and provide both image sensing data and radar or LiDAR sensing data as the forward-view sensing data. The processor may be configured to detect the preceding object in the region forward of the vehicle based on the image sensing data and the radar or LiDAR sensing data.

The processor may be further configured to output a braking signal for a braking system of the vehicle to decelerate the vehicle in response to detecting the preceding object in the region forward of the vehicle based on the forward-view sensing data and detecting a side object in the region on the side of the vehicle based on the side-view sensing data.

The processor may be further configured to determine a time to collision (TTC) or a distance to collision (DTC) measure relative to the detected preceding object based on the forward-view sensing data, and to output the steering signal for the steering system of the vehicle in response to determining that the TTC or the DTC falls below a predetermined value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
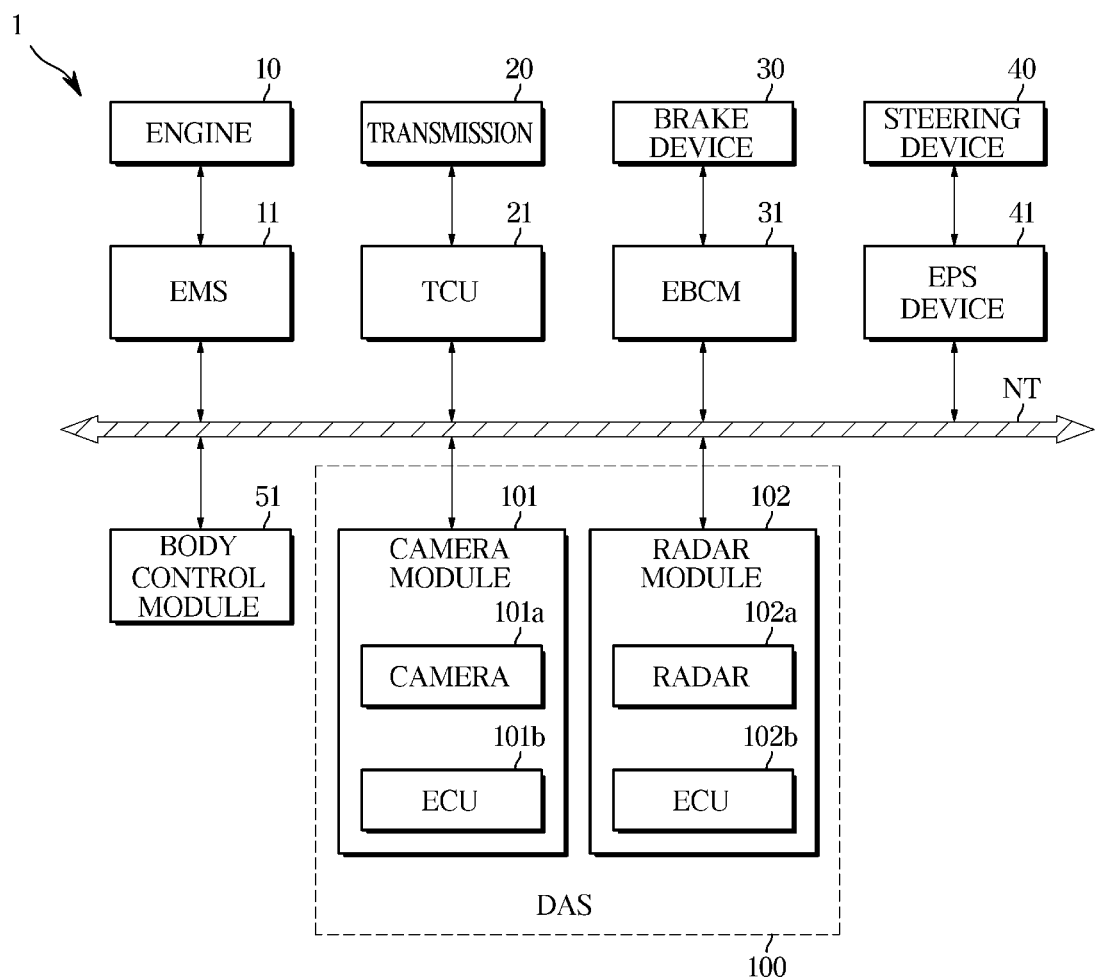
FIG. 1 is a block diagram illustrating components of a vehicle according to an embodiment of the present disclosure.

Reference will now be made in detail to the embodiments of the present disclosure, examples of which are illustrated in the accompanying drawings, wherein like reference numerals refer to like elements throughout. It should be noted that the specification of the present disclosure does not describe all the constituent elements of the embodiments, and general matters well known to those skilled in the art and redundant matters of the embodiments will not be described herein for clarity.

Throughout the specification of the present disclosure, terms "... part", "... module", "... member", "... block", and the like mean an element capable of being implemented by hardware, software, or a combination thereof. As used in the specification and appended claims, the term "... parts", "... modules", "... members", or "... blocks" may be implemented by a single constituent element, or the term "... part", "... module", "... member", or "... block" may include a plurality of constituent elements.

Throughout the specification of the present disclosure, if it is assumed that a certain part is connected (or coupled) to another part, the term "connection or coupling" means that the certain part is directly connected (or coupled) to another part and/or is indirectly connected (or coupled) to another part. Here, indirect connection (or indirect coupling) may conceptually include connection (or coupling) over a wireless communication network.

Throughout the specification of the present disclosure, if it is assumed that a certain part includes a certain component, the term "comprising or including" means that a corresponding component may further include other components unless context clearly indicates otherwise.

Throughout the specification of the present disclosure, if it is assumed that a certain member is referred to as "located ahead of" or "located behind" another element, the terms "located ahead of" or "located behind" mean that the element may be arranged to contact the another element or intervening elements may also be present between two members.

In description of the present disclosure, the terms "first" and "second" may be used to describe various components, but the components are not limited by the terms. These terms may be used to distinguish one component from another component. For example, a first component may be called a second component and a second component may be called a first component without departing from the scope of the present disclosure. The term "and/or" may include a combination of a plurality of items or any one of a plurality of items.

The terms "a", "an", "one", "the" and other similar terms include both singular and plural forms, unless context clearly dictates otherwise.

Identification numbers for use in respective operations to be described later are used for convenience of description and better understanding of the present disclosure, and do not describe the order or sequence of the respective operations of the present disclosure, and the respective operations of the present disclosure may be carried out in a different way from the order written in the present disclosure, unless context of each operation clearly indicates a specific order.

The principles of the present disclosure and the embodiments of the present disclosure will hereinafter be given with reference to the attached drawings.

FIG. 1 is a block diagram illustrating components of a vehicle 1 according to an embodiment of the present disclosure.

Referring to FIG. 1, the vehicle 1 may include an engine 10, a transmission 20, a brake device 30, and a steering device 40. The engine 10 may include at least one cylinder and at least one piston, and may generate power needed to drive the vehicle 1. Alternatively or additionally, the engine 10 may include an electric or other motor, such as an electric motor including a rotor and a stator, configured to generate power to move the vehicle 1. The transmission 20 may include a plurality of gears, and may transmit power generated by the engine 10 to wheels of the vehicle 1. The brake device 30 may decelerate or stop the vehicle 1 through frictional force on wheels. The brake device 30 may include one or more brake pads and brake shoes operative to decelerate or stop the vehicle. The steering device 40 may change the traveling direction of the vehicle 1. The steering device 40 may include a linkage operative to change a direction or orientation of wheel(s) of the vehicle 1.

The vehicle 1 may include a plurality of electronic constituent elements. For example, the vehicle 1 may further include an Engine Management System (EMS) 11, a Transmission Controller also referred to as a Transmission Control Unit (TCU) 21, an Electronic Brake Controller also referred to as an Electronic Brake Control Module (EBCM) 31, an Electronic Power Steering (EPS) device 41, a Body Control Module (BCM), and a Driver Assistance System (DAS) 100.

The EMS 11 may control the engine 10 in response to either the driver's acceleration intention from the acceleration pedal or a request signal from the driver assistance system (DAS) 100. For example, the EMS 11 may control torque of the engine 10.

The TCU 21 may control the transmission 20 in response to either a driver's gearshift command activated by a gearshift lever and/or a driving speed of the vehicle 1. For example, the TCU 21 may adjust or regulate a gearshift ratio from the engine 10 to wheels of the vehicle 1.

The electronic brake control module (EBCM) 31 may control a brake device 30 in response to either the driver's brake intention from a brake pedal or slippage of wheels. For example, the EBCM 31 may temporarily release wheel braking in response to wheel slippage detected in a braking mode of the vehicle 1, resulting in implementation of an Anti-lock Braking System (ABS). The EBCM 31 may selectively release braking of wheels in response to oversteering and/or understeering detected in a steering mode of the vehicle 1, resulting in implantation of Electronic Stability Control (ESC). In addition, the EBCM 31 may temporarily brake wheels in response to wheel slippage detected by vehicle driving, resulting in implementation of a Traction Control System (TCS).

The electronic power steering (EPS) device 41 may assist the steering device 40 in response to the driver's steering intention from the steering wheel, such that the EPS device 41 may assist the driver in easily handling the steering wheel. For example, the EPS device 41 may assist the steering wheel 40 in a manner that steering force decreases in a low-speed driving mode or a parking mode of the vehicle 1 but increases in a high-speed driving mode of the vehicle 1.

A body control module 51 may control various electronic components that are capable of providing the driver with user convenience or guaranteeing driver safety. For example, the body control module 51 may control headlamps (headlights), wipers, an instrument or other cluster, a multifunctional switch, turn signal indicators, or the like.

The driver assistance system (DAS) 100 may assist the driver in easily handling (e.g., driving, braking, and steering) the vehicle 1. For example, the DAS 100 may detect peripheral environments (e.g., a peripheral vehicle, pedestrian, cyclist, lane, traffic sign, or the like) of the vehicle 1 (i.e., host vehicle), and may perform driving, braking, and/or steering of the vehicle 1 in response to the detected peripheral environments.

The DAS 100 may provide the driver with various functions. For example, the DAS 100 may provide the driver with a Lane Departure Warning (LDW) function, a Lane Keeping Assist (LKA) function, a High Beam Assist (HBA) function, an Autonomous Emergency Braking (AEB) function, a Traffic Sign Recognition (TSR) function, a Smart Cruise Control (SCC) function, a Blind Spot Detection (BSD) function, or the like.

The DAS 100 may include a camera module 101 operative to acquire image data of a peripheral region of the vehicle 1 (e.g., a region outside of and surrounding the vehicle 1), and a radar module 102 operative to acquire data about a peripheral object present in the peripheral region of the vehicle 1. The camera module 101 may include a camera 101a or multiple cameras and an Electronic Control Unit (ECU) controller 101b. The camera 101a may capture an image including a forward region of the vehicle 1 (e.g., a region in front of the vehicle 1), and may include an image processor operative to process the captured image to recognize peripheral vehicles, pedestrians, cyclists, lanes, traffic signs, or the like in the captured image. The radar module 102 may include a radar 102a or multiple radars and an Electronic Control Unit (ECU) controller 102b, and may acquire or determine a relative position, a relative speed, or the like of the peripheral object (e.g., a peripheral vehicle, a pedestrian, or a cyclist) of the vehicle 1 based on sensed radar data.

The scope or spirit of the DAS 100 according to the present disclosure is not limited thereto, and the DAS 100 may further include a Light Detection And Ranging (LiDAR) sensor to detect the presence or absence of a peripheral object by monitoring (or scanning) the peripheral region of the vehicle 1.

The above-mentioned electronic components may communicate with each other through a vehicle communication network (NT). For example, the electronic components may perform data communication through Ethernet, Media Oriented Systems Transport (MOST), a FlexRay, a Controller Area Network (CAN), a Local Interconnect Network (LIN), or the like. For example, the DAS 100 may respectively transmit a drive control signal, a brake signal, and a steering signal to the EMS 11, the EBCM 31, and the EPS device 41 over the vehicle communication network (NT).

Figure 2:
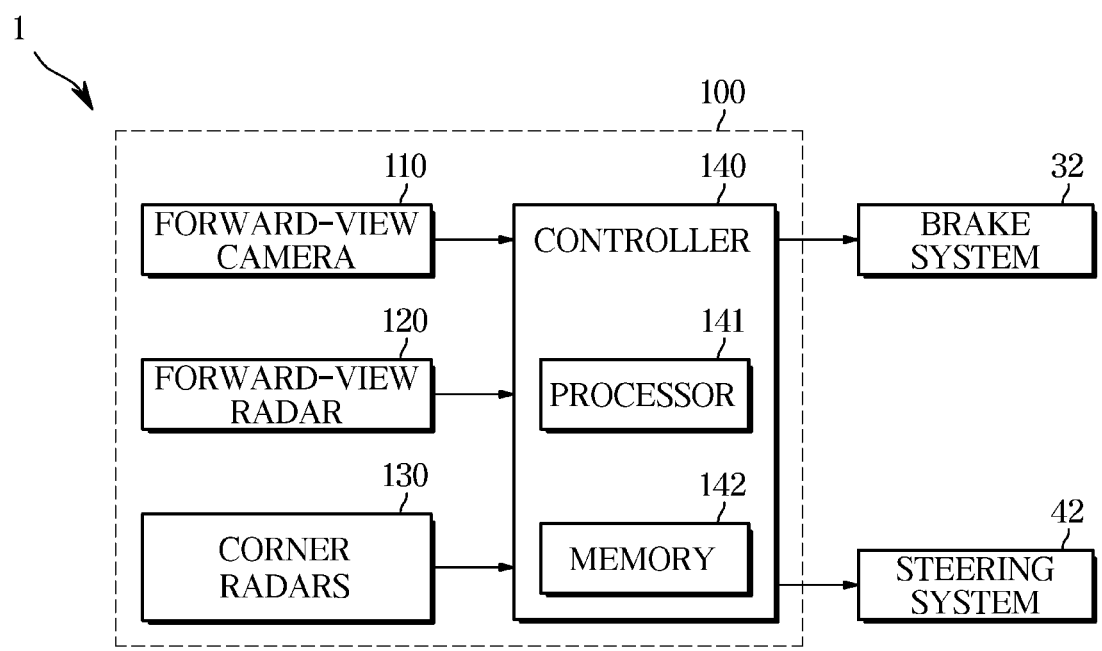
FIG. 2 is a block diagram illustrating a driver assistance system according to an embodiment of the present disclosure.
Figure 3:
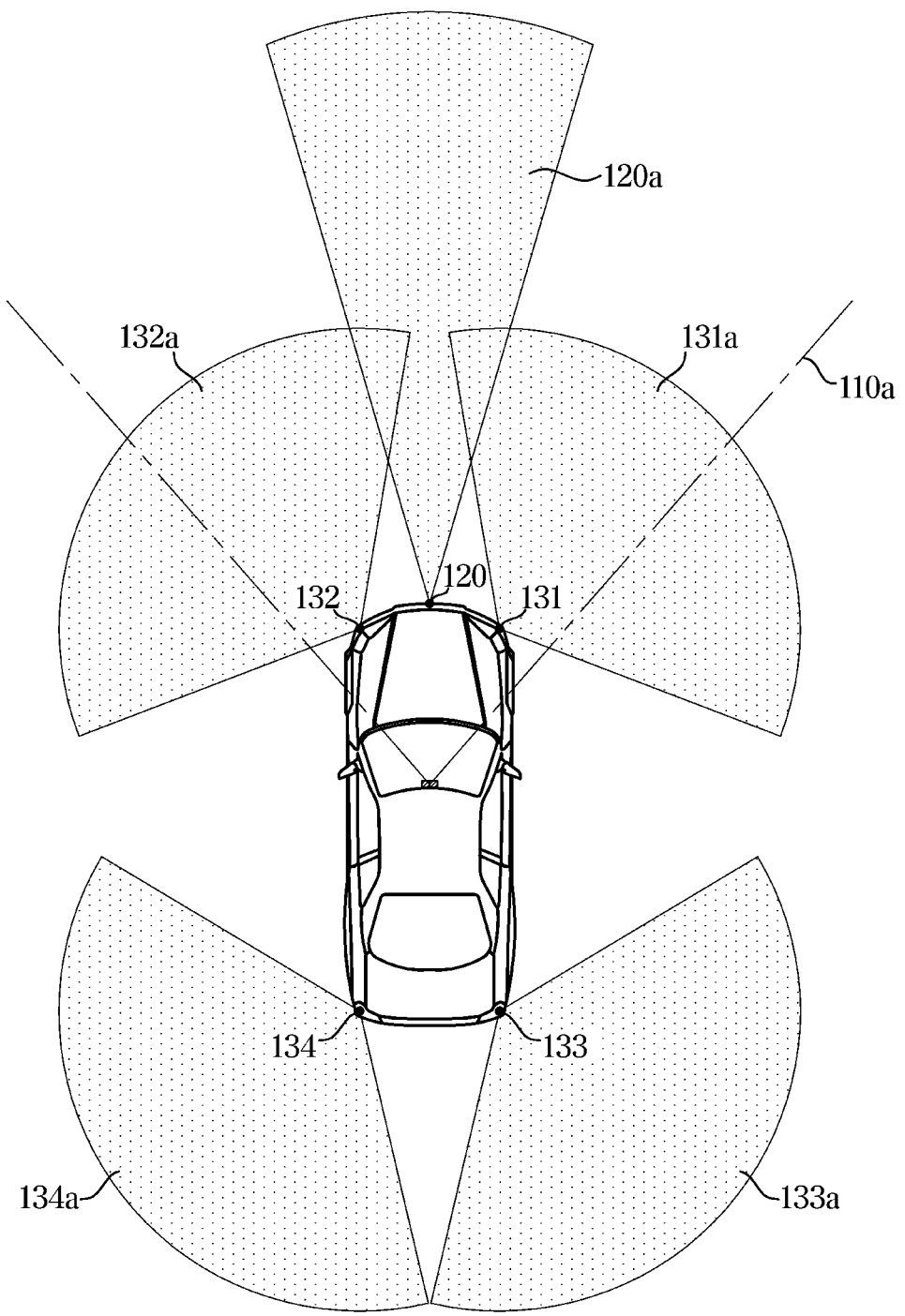
FIG. 3 is a conceptual diagram illustrating sensing ranges of a camera and a radar device for use in a driver assistance system according to an embodiment of the present disclosure.

FIG. 2 is a block diagram illustrating the driver assistance system (DAS) according to an embodiment of the present disclosure. FIG. 3 is a conceptual diagram illustrating fields of view/sensing of a camera and a radar device for use in the driver assistance system (DAS) according to an embodiment of the present disclosure.

Referring to FIG. 2, the vehicle 1 may include a brake system 32, a steering system 42, and a driver assistance system (DAS) 100.

The brake system 32 may include the Electronic Brake Controller or Electronic Brake Control Module (EBCM) 31 (see FIG. 1) and the brake device 30 (see FIG. 1). The steering system 42 may include the Electronic Power Steering (EPS) device 41 (see FIG. 1) and the steering device 40 (see FIG. 1).

The DAS 100 may include one or more of a forward-view camera 110, a forward-view radar 120, and a plurality of corner radars 130.

The forward-view camera 110 may include a Field of View (FOV) 110a oriented to the forward region of the vehicle 1, as shown in FIG. 3. The forward-view camera 110 may be installed at a windshield of the vehicle 1.

The forward-view camera 110 may capture an image of the forward region of the vehicle 1, and may acquire data of the forward-view image of the vehicle 1. The forward-view image data of the vehicle 1 may include information about the position of a peripheral vehicle, a pedestrian, a cyclist, or a lane located in the forward region of the vehicle 1.

The forward-view camera 110 may include a plurality of lenses and a plurality of image sensors. Each image sensor may include a plurality of photodiodes to convert light into electrical signals, and the photodiodes may be arranged in a two-dimensional (2D) matrix.

The forward-view camera 110 may be electrically coupled to the processor or controller 140. For example, the forward-view camera 110 may be connected to the controller 140 through a vehicle communication network (NT), Hardwires, or a Printed Circuit Board (PCB).

The forward-view camera 110 may transmit the forward-view image data of the vehicle 1 to the controller 140.

The forward-view radar 120 may include a Field of Sensing (FOS) 120a oriented to the forward region of the vehicle 1 as shown in FIG. 3. The forward-view radar 120 may be mounted to, for example, a grille or a bumper of the vehicle 1.

The forward-view radar 120 may include a transmission (Tx) antenna (or a transmission (Tx) antenna array) to emit transmission (Tx) waves to the forward region of the vehicle 1 and a reception (Rx) antenna (or a reception (Rx) antenna array) to receive waves reflected from any object located in the FOS. The forward-view radar 120 may acquire forward-view radar data not only from Tx waves received from the Tx antenna, but also from reflected waves received from the Rx antenna. The forward-view radar data may include not only information about a distance between the host vehicle 1 and a peripheral vehicle (or a pedestrian or cyclist or other preceding object) located in the forward region of the host vehicle 1, but also information about a speed of the peripheral vehicle, the pedestrian, or the cyclist. The forward-view radar 120 may calculate a relative distance between the host vehicle 1 and any object based on a difference in phase (or difference in time) between Tx waves and reflected waves, and may calculate a relative speed of the object based on a difference in frequency between the Tx waves and the reflected waves.

For example, the forward-view radar 120 may be coupled to the controller 140 through a vehicle communication network (NT), Hardwires, or a PCB. The forward-view radar 120 may transmit forward-view radar data to the controller 140.

The plurality of corner radars 130 may include a first corner radar 131 mounted to a forward right side of the vehicle 1, a second corner radar 132 mounted to a forward left side of the vehicle 1, a third corner radar 133 mounted to a rear right side of the vehicle 1, and a fourth corner radar 134 mounted to a rear left side of the vehicle 1.

The first corner radar 131 may include a field of sensing (FOS) 131a oriented to a forward right region of the vehicle 1, as shown in FIG. 3. For example, the forward-view radar 120 may be mounted to a right side of a front bumper of the vehicle 1. The second corner radar 132 may include an FOS 132a oriented to a forward left region of the vehicle 1, and may be mounted to, for example, a left side of the front bumper of the vehicle 1. The third corner radar 133 may include an FOS 133a oriented to a rear right region of the vehicle 1, and may be mounted to, for example, a right side of a rear bumper of the vehicle 1. The fourth corner radar 134 may include an FOS 134a oriented to a rear left region of the vehicle 1, and may be mounted to, for example, a left side of the rear bumper of the vehicle 1.

Each of the first, second, third, and fourth radars 131, 132, 133, and 134 may include a transmission (Tx) antenna and a reception (Rx) antenna. The first, second, third, and fourth corner radars 131, 132, 133, and 134 may respectively acquire first corner radar data, second corner radar data, third corner radar data, and fourth corner radar data. The first corner radar data may include information about a distance between the host vehicle 1 and an object (e.g., a peripheral vehicle, a pedestrian, or a cyclist) present in a forward right region of the host vehicle 1, and information about a speed of the object. The second corner radar data may include information about a distance between the host vehicle 1 and an object (e.g., a peripheral vehicle, a pedestrian, or a cyclist) present in a forward left region of the host vehicle 1, and information about a speed of the object. The third corner radar data may include information about a distance between the host vehicle 1 and an object (e.g., a peripheral vehicle, a pedestrian, or a cyclist) present in a rear right region of the host vehicle 1, and information about a speed of the object. The fourth corner radar data may include information about a distance between the host vehicle 1 and an object (e.g., a peripheral vehicle, a pedestrian, or a cyclist) present in a rear left region of the host vehicle 1, and information about a speed of the object.

Each of the first, second, third, and fourth corner radars 131, 132, 133, and 134 may be connected to the controller 140 through, for example, a vehicle communication network NT, Hardwires, or a PCB. The first, second, third, and fourth corner radars 131, 132, 133, and 134 may respectively transmit first corner radar data, second corner radar data, third corner radar data, and fourth corner radar data to the controller 140. The controller 140 may include a controller (ECU) 101b (see FIG. 1) of the camera module 101 (see FIG. 1), a controller (ECU) 102b (see FIG. 2) of the radar module 102 (see FIG. 1), and/or an additional integrated controller.

The controller 140 may include a processor 141 and a memory 142.

The processor 141 may process forward-view image data of the forward-view camera 110, forward-view radar data of the forward-view radar 120, and corner radar data of the plurality of corner radars 130, and may generate a brake signal controlling the brake system 32 and a steering signal controlling the steering system 42. For example, the processor 141 may include an image processor to process forward-view image data of the forward-view camera 110, a digital signal processor to process radar data detected by the radars 120 and 130, and/or a Micro-Control Unit (MCU) to generate a brake signal and a steering signal.

The processor 141 may detect the presence or absence of a preceding object (e.g., a peripheral vehicle, a pedestrian, a cyclist, or the like) in the forward region of the vehicle 1 based on the forward-view image data of the forward-view camera 110 and the forward-view radar data of the forward-view radar 120.

In more detail, the processor 141 may acquire the position (distance and direction) of each preceding object of the vehicle 1 and information about a relative speed of each preceding object. The processor 141 may acquire information about the position (direction) and type (e.g., a peripheral vehicle, a pedestrian or a cyclist) of each preceding object of the vehicle 1 upon receiving the forward-view image data from the forward-view camera 110. In addition, the processor 141 may match the objects detected by the forward-view image data to objects detected by the forward-view radar data, respectively. The processor 141 may acquire information about the type (e.g., vehicle, pedestrian, cyclist, or other unclassified object), position, and relative speed of each preceding object of the vehicle 1.

The processor 141 may generate a brake signal and a steering signal based on the type information of each preceding object and the relative speed of each preceding object.

For example, the processor 141 may calculate a Time-to-Collision (TTC) between the vehicle 1 and the preceding object based on the position (distance) and relative speed of each preceding object, may compare the calculated TTC with a predetermined reference time, and may warn the driver about a high possibility of collision with the preceding object or may transmit a brake signal to the brake system 32. In response to a TTC shorter than a first reference time, the processor 141 may control an audio device and/or a display to output a warning message. In response to a TTC shorter than a second reference time, the processor 141 may transmit a prior braking signal to the brake system 32. In response to a TTC shorter than a third reference time, the processor 141 may transmit an emergency braking signal to the brake system 32. In this case, the second reference time may be shorter than the first reference time, and the third reference time may be shorter than the second reference time.

In another example, the processor 141 may calculate a Distance-to-Collision (DTC) based on a relative speed of each preceding object, and may warn the driver about a high possibility of collision with the preceding object or may transmit a brake signal to the brake system 32 according to the result of comparison between the calculated DTC and the distance to each preceding object.

The processor 141 may acquire information about the position and relative speed of each side object (e.g., a forward right object, a forward left object, a rear right object, or a rear left object) located in the side region of the vehicle 1 based on corner radar data received from the corner radars 130.

The processor 141 may transmit a steering signal to the steering system 42 based on the position (distance and direction) and relative speed of the side object of the vehicle 1.

For example, if there is a high possibility of collision between the host vehicle 1 and a preceding object based on the TTC or DTC parameter, the processor 141 may transmit a steering signal to the steering system 42 so as to avoid collision with the preceding object.

The processor 141 may determine whether the vehicle 1 can avoid collision with the preceding object by changing the traveling direction of the vehicle 1 to another lane based on the position (distance and direction) and relative speed of side objects of the vehicle 1. For example, if there is no side object of the vehicle 1, the processor 141 may transmit a steering signal to the steering system 42 to avoid collision with the preceding object. If the possibility of collision between the steered vehicle 1 and the side object is not high based on information about the position (distance and direction) and relative speed of each side object, the processor 141 may transmit the steering signal to the steering system 42 to avoid collision with the preceding object. If there is a high possibility of collision with the steered vehicle 1 and the side object based on information about the position (distance and direction) and relative speed of each side object, the processor 141 may not transmit the steering signal to the steering system 42.

The memory 142 may store programs and/or data needed for allowing the processor 141 to process image data, may store programs and/or data needed for the processor 141 to process radar data, and may store programs and/or data needed for the processor 141 to generate a brake signal and/or a steering signal.

The memory 142 may temporarily store image data received from the forward-view camera 110 and/or radar data received from the radars 120 and 130, and may also temporarily store the processed results of the image data and/or the radar data handled by the processor 141.

The memory 142 may include not only a volatile memory, such as a Static Random Access memory (SRAM) or a Dynamic Random Access Memory (DRAM), but also a non-volatile memory, such as a flash memory, a Read Only Memory (ROM), or an Erasable Programmable Read Only Memory (EPROM), The scope or spirit of the DAS 100 according to the present disclosure is not limited to FIG. 2, and the DAS 100 may additionally or alternatively include a Light Detection And Ranging (LiDAR) sensor to detect the presence or absence of a peripheral object by monitoring (or scanning) the peripheral region of the vehicle 1.

Likewise, the controller 140 may transmit the brake signal to the brake system 32 based on information about the high possibility of collision with the preceding object. If there is no side object or there is a low possibility of collision with the side object, the controller 140 may transmit the steering signal to the steering system 42 so as to avoid collision with the preceding object. If there is a high possibility of collision between the steered vehicle 1 and the side object, the controller 140 may not transmit the steering signal to the steering system 42.

Figure 4:
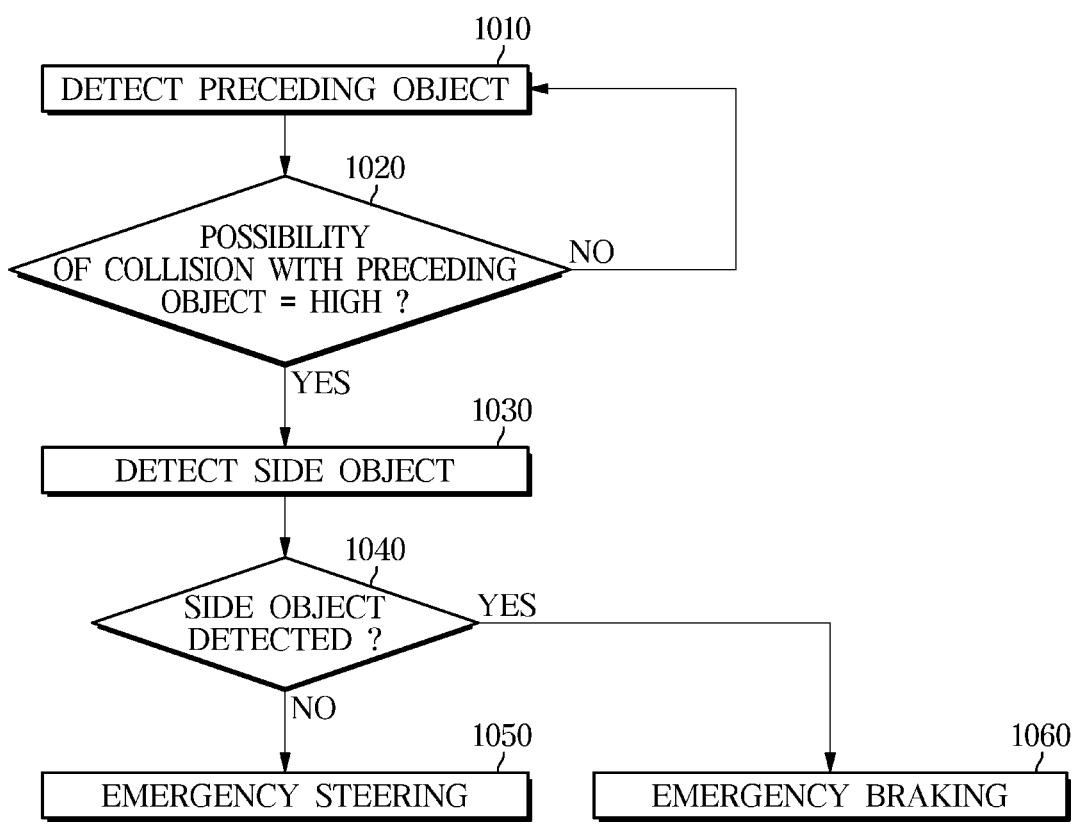
FIG. 4 is a flowchart illustrating a method for performing emergency steering and/or emergency braking of a driver assistance system according to an embodiment of the present disclosure.

FIG. 4 is a flowchart illustrating a method for performing emergency steering and/or emergency braking of the driver assistance system (DAS) according to an embodiment of the present disclosure. FIGS. 5, 6, 7, 8, and 9 are conceptual diagrams illustrating exemplary methods for performing emergency steering and/or emergency braking of the driver assistance system (DAS) according to an embodiment of the present disclosure.

Referring to FIG. 4, the DAS 100 may detect the presence or absence of a preceding object of the vehicle 1 (1010).

The controller 140 may receive image data from the forward-view camera 110, and/or may receive radar data from the forward-view radar 120.

The controller 140 may detect the presence or absence of a peripheral or preceding object (e.g., a vehicle, a pedestrian, a cyclist, or other object) located in the forward region of the vehicle 1 based on the image data and/or the radar data. For example, upon receiving the image data and/or the radar data, the controller 140 may acquire information about the type, position (distance and direction), and relative speed of the peripheral or preceding object located in the forward region of the vehicle 1.

The DAS 100 may determine whether there is a high possibility of collision between the host vehicle 1 and the peripheral or preceding object (1020).

The controller 140 may predict whether there is a high possibility of collision between the host vehicle 1 and the preceding object based on the position (distance and direction) and relative speed of the preceding object.

For example, the controller 140 may calculate a Time-to-Collision (TTC) between the host vehicle 1 and the preceding object based on the position and relative speed of the preceding object, may compare the calculated TTC with a predetermined reference time, and may thus predict whether there is high possibility of collision with the preceding object.

If there is no possibility or low possibility of collision between the host vehicle 1 and the preceding object (NO in 1020), the DAS 10 may repeatedly detect the presence or absence of any preceding object present in the forward region of the host vehicle 1.

For example, if the TTC is longer than the predetermined reference time, the controller 140 may re-detect the position (distance and direction) and relative speed of the preceding object.

If there is a high possibility of collision between the host vehicle 1 and the preceding object (YES in 1020), the DAS may detect the presence or absence of a side object of the vehicle 1 (1030).

For example, if the TTC is equal to or shorter than the predetermined reference time, the controller 140 may predict the high possibility of collision between the host vehicle 1 and the preceding object.

The controller 140 may receive radar data from the plurality of corner radars 130, and may detect the presence or absence of any object located in the side regions (e.g., a forward right region, a forward left region, a rear right region, and/or a rear left region) of the vehicle 1. For example, the controller 140 may acquire the position (distance and direction) and relative speed of each side object based on the received radar data.

The DAS 100 may determine whether there is a side object located in the side region of the vehicle 1 (1040).

The controller 140 may determine the presence or absence of the side object of the vehicle 1 based on radar data received from the corner radars 130.

If the side object of the vehicle 1 is not detected (NO in 1040), the DAS 100 may perform emergency steering (1050).

If the side object of the vehicle 1 is not detected (1040), the controller 140 may transmit the steering signal to the steering system 42 so as to avoid collision between the vehicle 1 and the preceding object.

Figure 5:
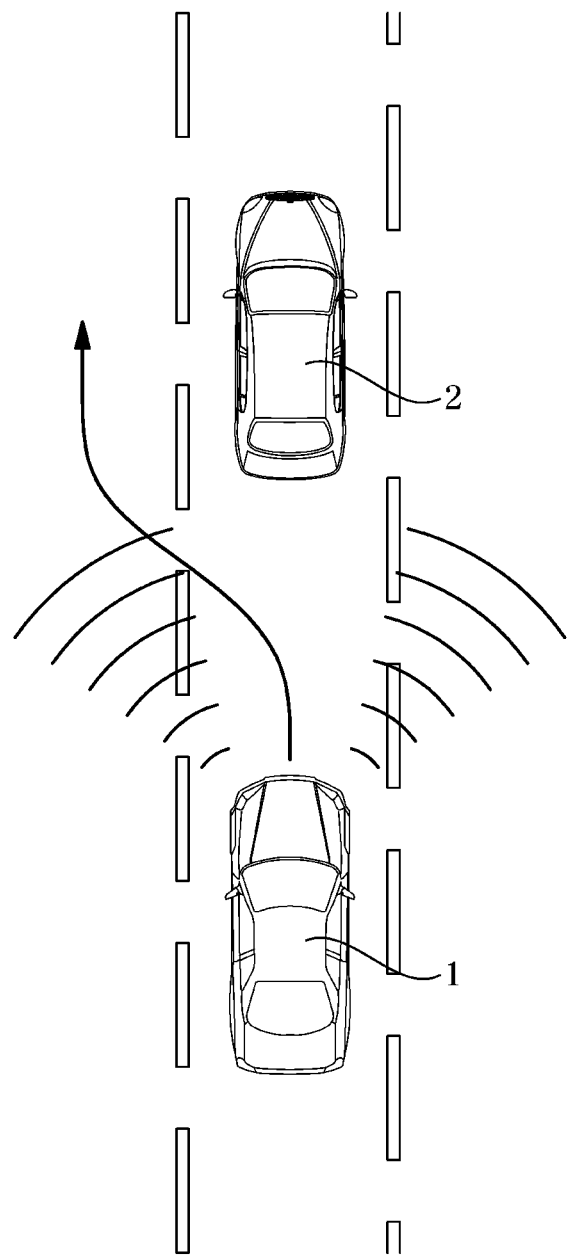
FIGS. 5, 6, 7, 8, and 9 are conceptual diagrams illustrating exemplary methods for performing emergency steering and/or emergency braking of a driver assistance system according to an embodiment of the present disclosure.

For example, as shown in FIG. 5, the vehicle 1 may be located behind the preceding vehicle 2 while simultaneously following the preceding vehicle 2. If the preceding vehicle 2 is suddenly braked, the controller 140 may predict collision between the vehicle 1 and the preceding vehicle 2.

When collision between the vehicle 1 and the preceding vehicle 2 is predicted, the controller 140 may detect a right object located in the right region of the vehicle 1 based on radar data received from the first and third corner radars 131 and 133, and may detect a left object located in the left region of the vehicle 1 based on radar data received from the second and fourth corner radars 132 and 134. If no object is detected in any one of the right region and the left region of the vehicle 1 (e.g., if at least one of the right region and the left region is determined to be free of objects), the controller 140 may generate a steering signal to change the traveling direction of the vehicle 1, and may then transmit the steering signal to the steering system 42, such that the vehicle 1 can travel in another direction in which no object is detected (e.g., in a direction of the right region or the left region that is determined to be free of objects).

As a result, as shown in FIG. 5, the vehicle 1 may turn left, and may then pass the preceding vehicle 2 ahead.

Figure 6:
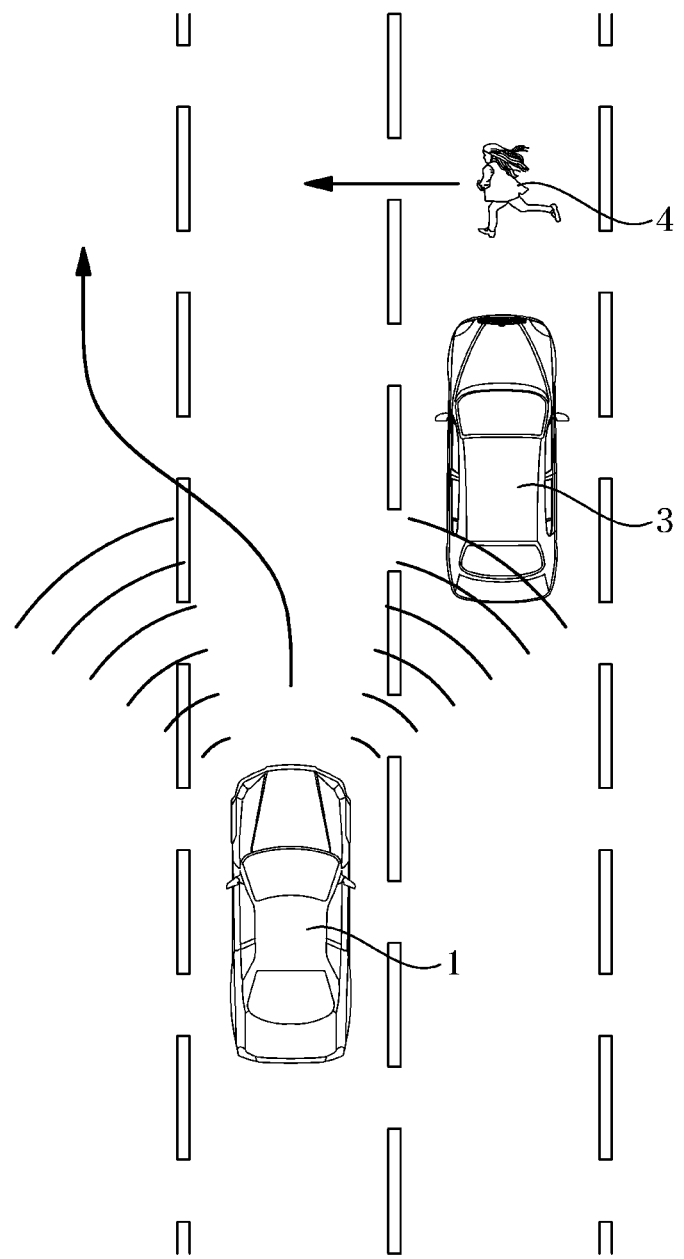

For example, as shown in FIG. 6, the vehicle 1 may pass a side lane of a stopped (parked) vehicle 3. If a pedestrian 4 suddenly appears in the lane of the vehicle 1 passing the stopped vehicle 3, the controller 140 may predict collision between the vehicle 1 and the pedestrian 4. If such collision between the vehicle 1 and the pedestrian 4 is predicted, the controller 140 may detect the presence or absence of a side object of the vehicle 1 based on radar data received from the corner radars 130, and may generate a steering signal such that the vehicle 1 can travel in another direction in which no side object is detected (e.g., in which the pedestrian 4 is not detected). In order to avoid collision with the pedestrian 4, the controller 140 may change the traveling direction of the vehicle 1 to the left direction, such that the vehicle 1 may pass the left side of the pedestrian 4.

Figure 7:
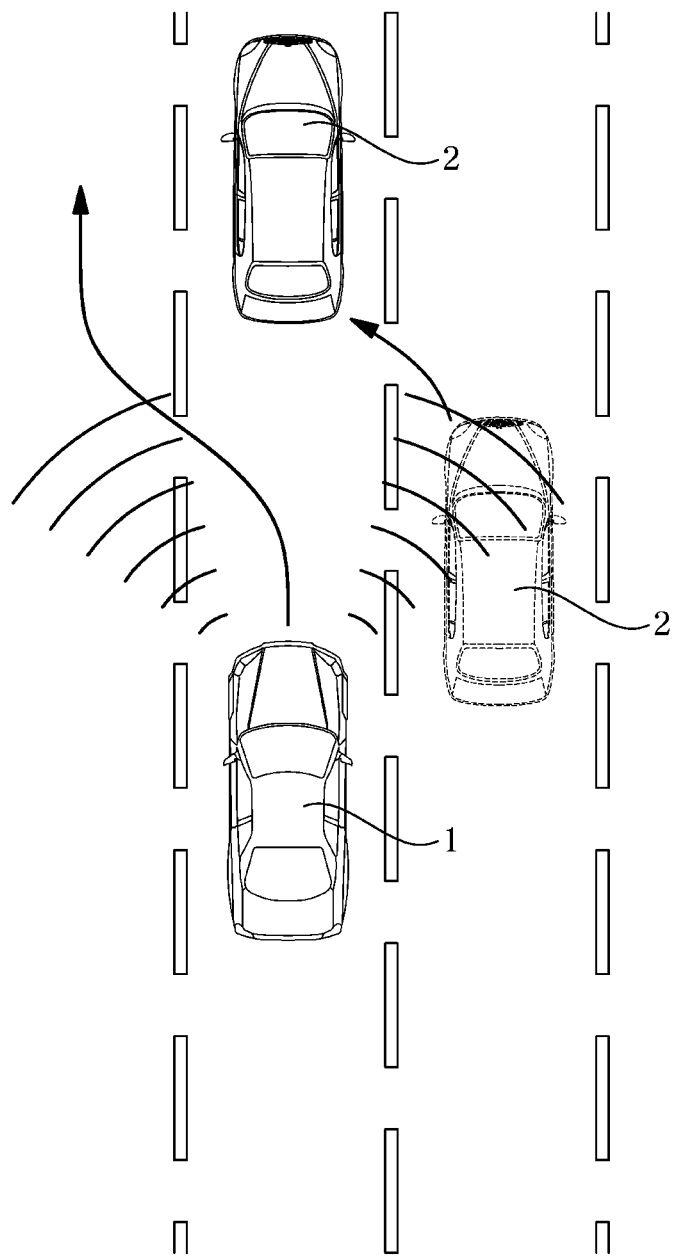

For example, as shown in FIG. 7, if another peripheral vehicle 2 cuts in front of the host vehicle 1, the controller 140 may predict collision with the cutting-in peripheral vehicle 2. The controller 140 may generate the steering signal to command the host vehicle 1 to travel in the opposite direction (i.e., the left lane of the host vehicle 1) relative to the direction from which the peripheral vehicle cut-in (i.e., the right lane of the host vehicle 1), and may transmit the generated steering signal to the steering system 42. The host vehicle 1 may pass in the left lane relative to the peripheral vehicle 2 ahead.

Figure 8:
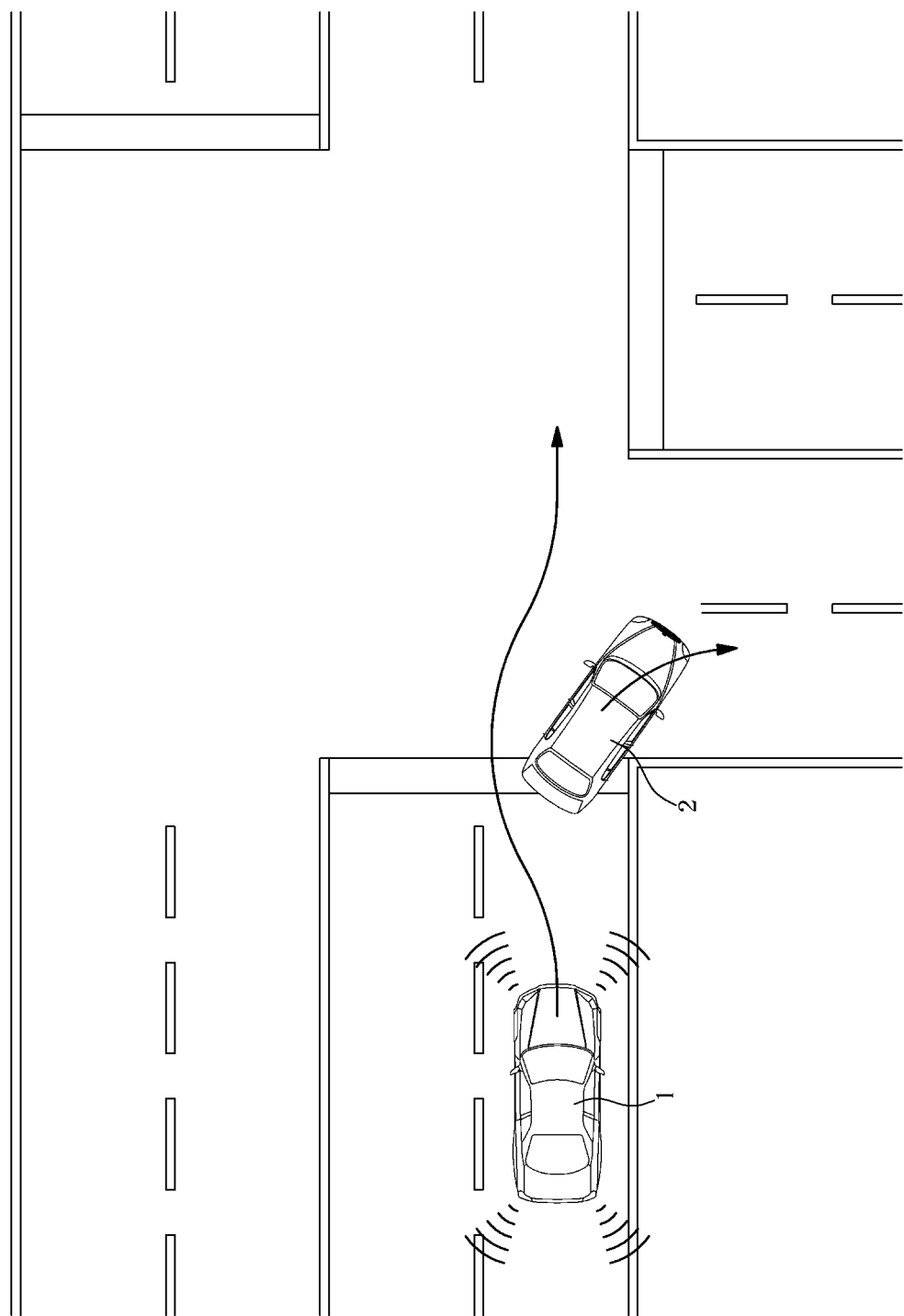

For example, as shown in FIG. 8, if the preceding vehicle 2 changes a current lane to another lane or turns to the right, the host vehicle 1 may avoid collision with the preceding vehicle 2. If collision with the preceding vehicle 2 is predicted as a result of a lane change or turning-right action of the preceding vehicle 2, the controller 140 may detect the presence or absence of any side object located in the side region of the host vehicle 1. If no side object of the host vehicle 1 is detected in at least one side of the host vehicle 1, the host vehicle 1 may be steered to the opposite direction to the traveling direction of the preceding vehicle 2, such that the host vehicle 1 can avoid collision with the preceding vehicle 2.

Figure 9:
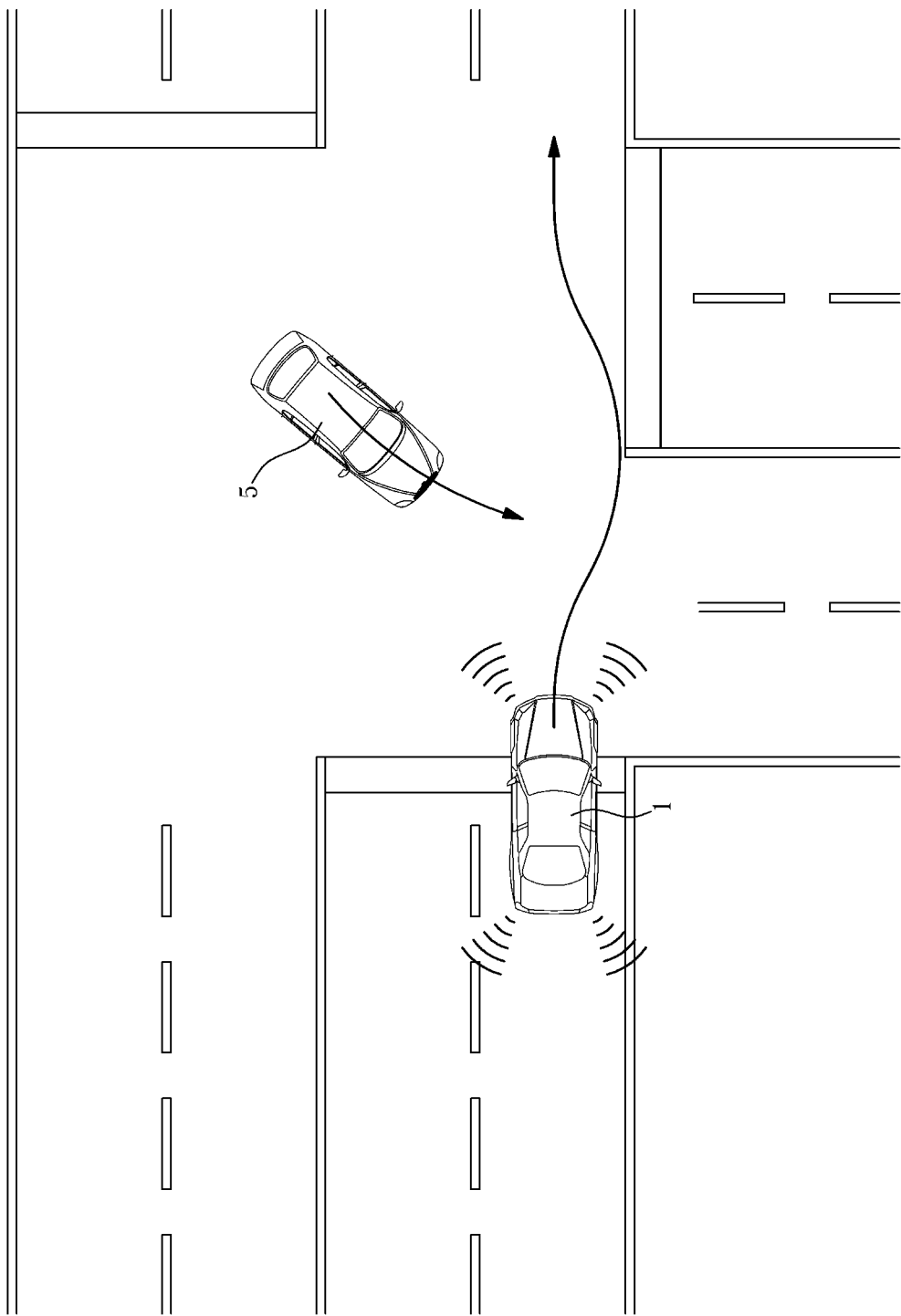

For example, as shown in FIG. 9, assuming that an oncoming vehicle 5 cuts in front of the host vehicle 1 or turns left in front of the host vehicle 1, the host vehicle 1 can avoid collision with the oncoming vehicle 5. If collision between the host vehicle 1 and the oncoming vehicle 5 due to a lane invasion or turning-left action of the oncoming vehicle 5 is predicted, the controller 140 may detect the presence or absence of the side object of the host vehicle 1. If no side object of the host vehicle 1 is detected, the host vehicle 1 can avoid collision with the oncoming vehicle 1 as shown in FIG. 9.

However, the scope or spirit of the present disclosure is not limited to emergency steering, and the controller 140 may respectively transmit the steering signal and the brake signal to the steering system 42 and the brake system 32 so as to prevent collision with the preceding object of the host vehicle 1.

If the side object of the host vehicle 1 is detected (YES in 1040), the DAS 10 may perform emergency braking (1060).

If the side object of the host vehicle 1 is detected, the controller 140 may determine that it is impossible for the host vehicle 1 to avoid collision with a preceding object using the steering action only, and may transmit the brake signal to the brake system 32 to reduce impact caused by such collision with the preceding object.

As described above, when collision between the host vehicle 1 and the preceding object is predicted, the DAS 100 may detect the presence or absence of the side object of the host vehicle 1. If no side object of the host vehicle 1 is detected, the DAS 100 may control the steering system 42 in a manner that the host vehicle 1 turns left or right so as to change a current traveling direction to another traveling direction. In addition, if the side object of the host vehicle 1 is detected, the DAS 10 may control the brake system 32 to brake the host vehicle 1.

Figure 10:
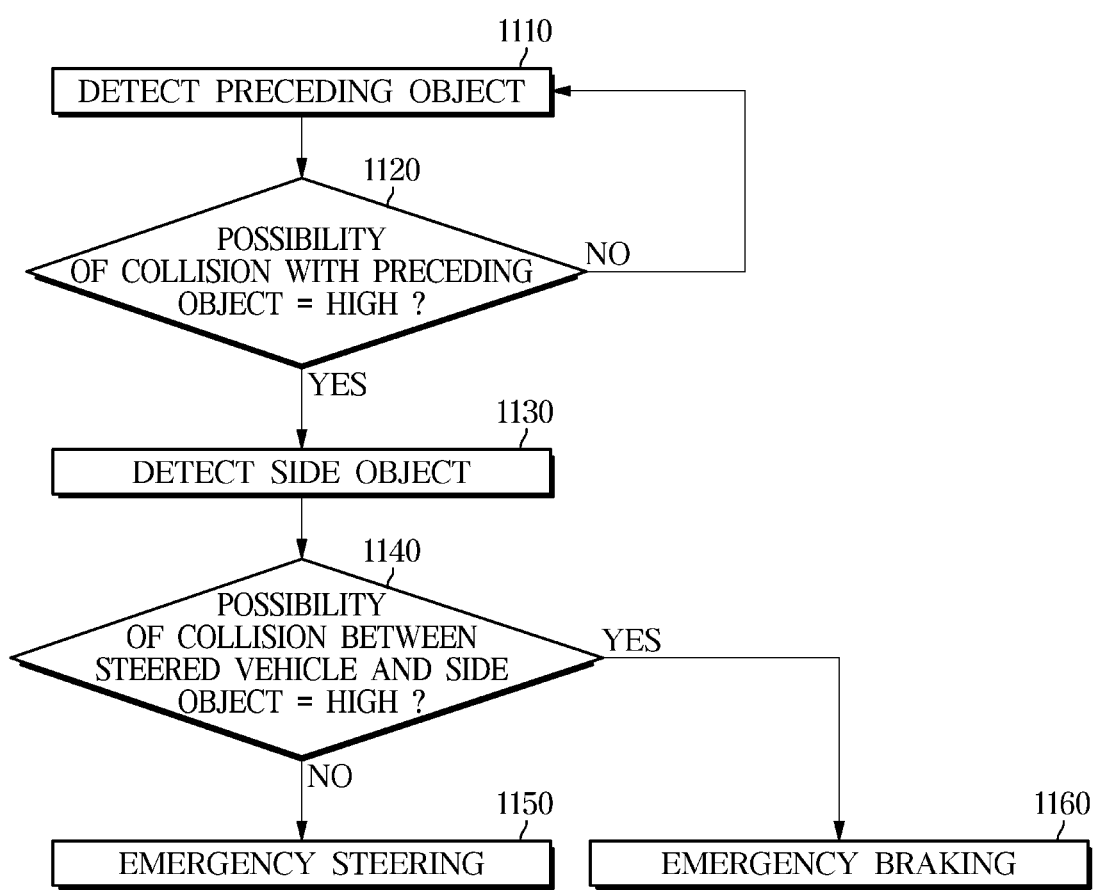
FIG. 10 is a flowchart illustrating a method for performing emergency steering and/or emergency braking of a driver assistance system according to another embodiment of the present disclosure.

FIG. 10 is a flowchart illustrating a method for performing emergency steering and/or emergency braking of the driver assistance system (DAS) according to another embodiment of the present disclosure. FIGS. 11, 12, 13, and 14 are conceptual diagrams illustrating exemplary methods for performing emergency steering and/or emergency braking of the driver assistance system (DAS) according to another embodiment of the present disclosure.

Referring to FIG. 10, the DAS 100 may detect the presence or absence of a preceding object of the host vehicle 1 (1110). The DAS 100 may determine whether there is a high possibility of collision between the host vehicle 1 and the preceding object (YES in 1120), the DAS 100 may detect the presence or absence of a side object of the host vehicle 1 (1130).

Operations 1110, 1120, and 1130 shown in FIG. 10 may be respectively identical to Operations 1010, 1020, and 1030 shown in FIG. 4.

After detecting the presence of the side object of the host vehicle 1, the DAS 100 may determine whether there is a high possibility of collision between the steered host vehicle 1 and the side object (1140).

The controller 140 may predict whether there is a high possibility of collision between the host vehicle 1 and the side object based on the position (distance and direction) and relative speed of the side object.

For example, the controller 140 may calculate a route to the side object based on the position of the side object, and may calculate a Time-to-Collision (TTC) between the host vehicle 1 and the side object based on both the distance to the side object and the relative speed of the side object. The controller 140 may compare the TTC with a predetermined reference time, and may predict whether there is a high possibility of collision between the steered host vehicle 1 and the side object.

If there is no or low possibility (e.g., not high possibility) of collision between the host vehicle 1 and the side object (NO in 1140), the DAS 100 may perform emergency steering (1150).

For example, if the TTC between the host vehicle 1 and the side object is longer than the reference time, the controller 140 may predict that there is no possibility or low possibility of collision between the steered host vehicle 1 and the side object. In addition, the controller 140 may transmit the steering signal to the steering system so as to avoid collision between the host vehicle 1 and a preceding object.

Figure 11:
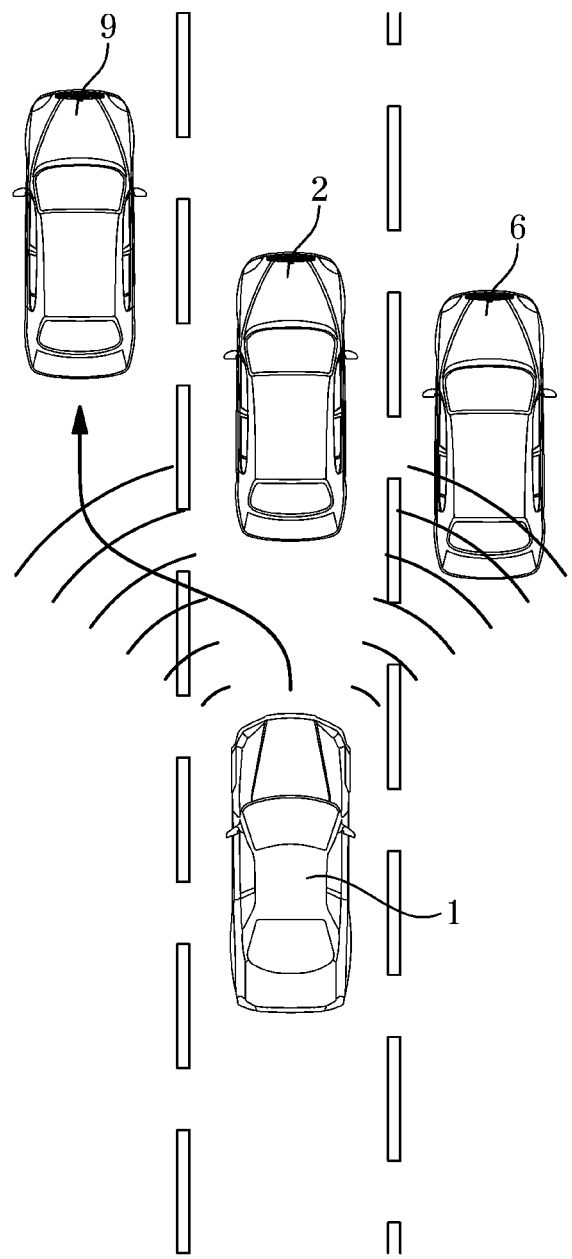
FIGS. 11, 12, 13, and 14 are conceptual diagrams illustrating exemplary methods for performing emergency steering and/or emergency braking of a driver assistance system according to another embodiment of the present disclosure.

For example, as shown in FIG. 11, the host vehicle 1 may be located behind the preceding vehicle 2 while simultaneously following the preceding vehicle 2, and a right peripheral vehicle 6 and a left peripheral vehicle 9 may be located in the side region of the preceding vehicle 2. In addition, the preceding vehicle 2 may be located ahead of the right peripheral vehicle 6, and the left peripheral vehicle 9 may be located ahead of the preceding vehicle 2.

If collision between the host vehicle 1 and the preceding vehicle 2 due to sudden or abrupt braking of the preceding vehicle 2 is predicted, the controller 140 may detect the right peripheral vehicle 6 and the left peripheral vehicle 9 based on radar data received from the plurality of corner radars 130.

The controller 140 may detect the position (distance and direction) and relative speed of each of the right peripheral vehicle 6 and the left peripheral vehicle 9. Upon receiving the position (distance and direction) and relative speed of each of the right peripheral vehicle 6 and the left peripheral vehicle 9, the controller 140 may calculate not only a time-to-collision (TTC) between the steered host vehicle 1 and the right peripheral vehicle 6, but also a time-to-collision (TTC) between the steered host vehicle 1 and the left peripheral vehicle 9. The controller 140 may predict whether there is a high possibility of collision between the steered host vehicle 1 and the right peripheral vehicle 6 based on a TTC between the steered host vehicle 1 and the right peripheral vehicle 6, and may also predict whether there is a high possibility of collision between the steered host vehicle 1 and the left peripheral vehicle 9 based on a TTC between the steered host vehicle 1 and the left peripheral vehicle 9.

If there is no possibility of collision with the left peripheral vehicle 9, the controller 140 may generate a steering signal to command the host vehicle 1 to turn left, and may transmit the generated steering signal to the steering system 42.

As a result, the host vehicle 1 may change a current traveling direction to the left direction, and may follow the left peripheral vehicle 9, as shown in FIG. 11.

However, the scope or spirit of the present disclosure is not limited to emergency steering, and the controller 140 may respectively transmit the steering signal and the brake signal to the steering system 42 and the brake system 32 so as to avoid collision with either the preceding object or the side object.

Figure 12:
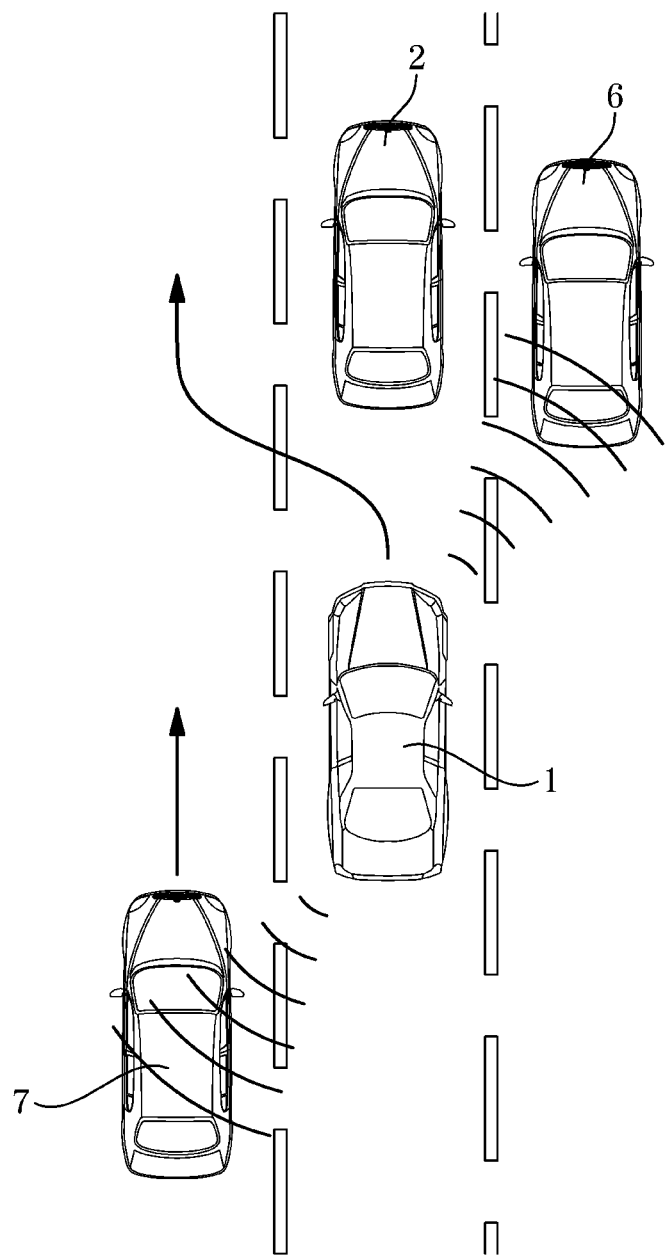

For example, as shown in FIG. 12, the host vehicle 1 may be located behind the preceding vehicle 2, and the right peripheral vehicle 6 and the left peripheral vehicle 7 may be located in the side region of the preceding vehicle 2. In addition, the preceding vehicle 2 may be located ahead of the right peripheral vehicle 6, and the left peripheral vehicle 7 may be located behind the host vehicle 1.

If the high possibility of collision between the host vehicle 1 and the preceding vehicle 2 due to sudden or abrupt braking is predicted, the controller 140 may detect the position (distance and direction) and relative speed of each of the right peripheral vehicle 6 and the left peripheral vehicle 7 based on radar data received from the plurality of corner radars 130. The controller 140 may predict whether there is a high possibility of collision with the right peripheral vehicle 6 based on the position (distance and direction) and relative speed of the right peripheral vehicle 6, and may also predict whether there is a high possibility of collision with the left peripheral vehicle 7 based on the position (distance and direction) and relative speed of the left peripheral vehicle 7.

The controller 140 may predict that there is no possibility or low possibility of collision between the steered host vehicle 1 and the left peripheral vehicle 7, and the host vehicle 1 may change a current traveling direction to the left direction and may travel in front of the left peripheral vehicle 7 as shown in FIG. 12.

If emergency steering and emergency braking are simultaneously carried out, and if collision between the host vehicle 1 and the side object is predicted, the controller 140 may generate only the steering signal without generating the brake signal.

If there is a high possibility of collision between the host vehicle 1 and the side object (YES in 1140), the DAS 100 may perform emergency braking (1160).

For example, if a TTC between the host vehicle 1 and the side object is equal to or shorter than a predetermined reference time, the controller 140 may predict that there is a high possibility of collision between the steered host vehicle 1 and the side object. In addition, the controller 140 may transmit a brake signal to the brake system 32 so as to reduce impact caused by collision with the preceding object.

Figure 13:
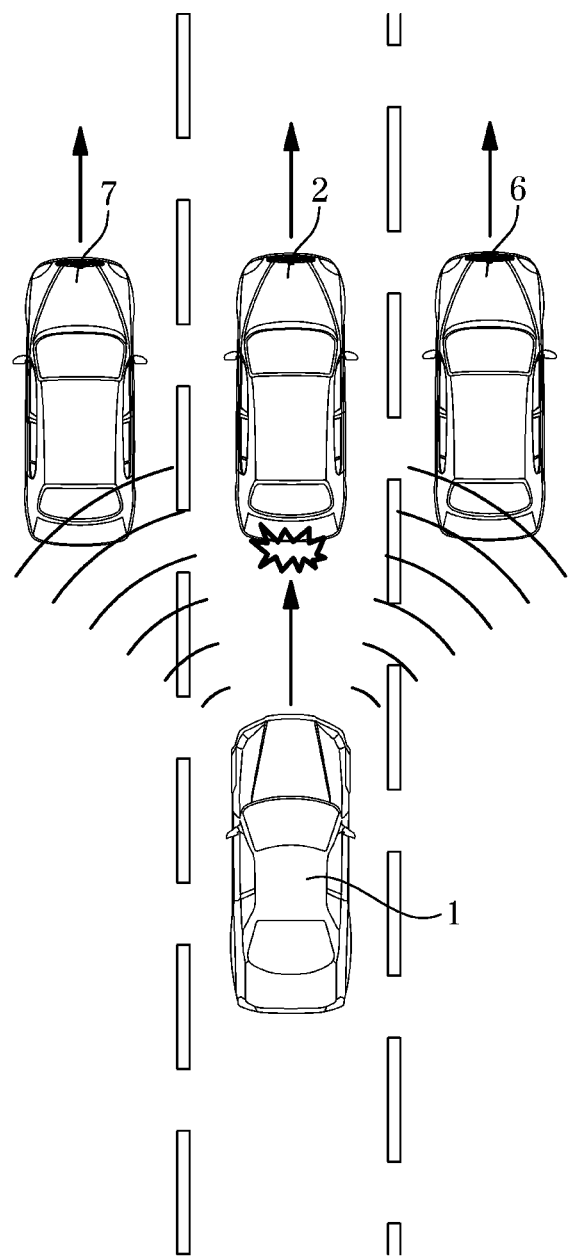

For example, as shown in FIG. 13, the host vehicle 1 may follow the preceding vehicle 2, and the right peripheral vehicle 6 and the left peripheral vehicle 7 may be located in the side region of the preceding vehicle 2. In addition, the preceding vehicle 2 may be located ahead of the right peripheral vehicle 6 and the left peripheral vehicle 7. If collision between the host vehicle 1 and the preceding vehicle 2 due to sudden or abrupt braking of the preceding vehicle 2 is predicted, the controller 140 may predict whether there is a high possibility of collision between the host vehicle 1 and the right peripheral vehicle 6 based on radar data received from the plurality of corner radars 130, and may also predict whether there is a high possibility of collision between the host vehicle 1 and the left peripheral vehicle 7 based on radar data received from the plurality of corner radars 130. After completion of the steering action of the host vehicle 1, if collision between the steered host vehicle 1 and the right peripheral vehicle 6 is predicted or if collision between the steered host vehicle 1 and the left peripheral vehicle 7 is predicted, the controller 140 may generate a brake signal, and may transmit the generated brake signal to the brake system 32.

Figure 14:
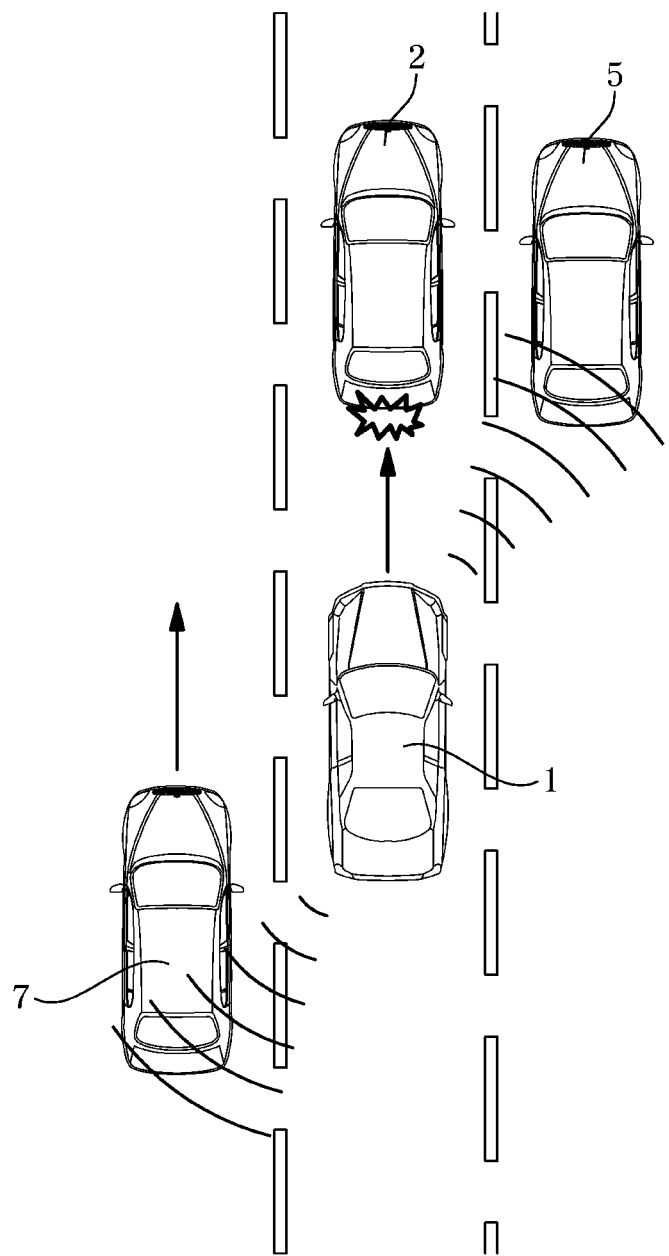

For example, as shown in FIG. 14, if collision between the host vehicle 1 and the preceding vehicle 2 due to sudden or abrupt braking of the preceding vehicle 2 is predicted, the controller 140 may predict whether there is a high possibility of collision between the host vehicle 1 and the right peripheral vehicle 5 based on radar data received from the plurality of corner radars 130, and may also predict whether there is a high possibility of collision between the host vehicle 1 and the left peripheral vehicle 7 based on radar data received from the plurality of corner radars 130. After completion of the steering action of the host vehicle 1, if collision between the steered host vehicle 1 and the right peripheral vehicle 5 is predicted or if collision between the steered host vehicle 1 and the left peripheral vehicle 7 is predicted, the controller 140 may generate a brake signal, and may transmit the generated brake signal to the brake system 32.

The above-mentioned embodiments may be implemented in the form of a recording medium storing commands capable of being executed by a computer system. The commands may be stored in the form of program code. When the commands are executed by the processor, a program module is generated by the commands so that the operations of the disclosed embodiments may be carried out. The recording medium may be implemented as a computer-readable recording medium.

The computer-readable recording medium includes all kinds of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

As is apparent from the above description, the driver assistance system and the method for controlling the same according to the embodiments of the present disclosure may avoid collision between a host vehicle and a preceding object using emergency steering.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A driver assistance system (DAS) comprising:
 a first forward-view sensor comprising an image sensor mounted to a vehicle, having a field of view (FOV) including a region forward of the vehicle, and configured to acquire forward-view image data;
 a second forward-view sensor comprising at least one of a radar sensor or a Light Detection And Ranging (LiDAR) sensor mounted to the vehicle, having a field of sensing (FOS) including the region forward of the vehicle, and configured to acquire forward-view sensing data;
 a corner sensor comprising at least one of a radar sensor or a LiDAR sensor, mounted to the vehicle, having a field of sensing (FOS) including a region on a side of the vehicle, and configured to acquire side-view sensing data; and
 a controller provided with a processor configured to process the forward-view image data, the forward-view sensing data, and the side-view sensing data,
 wherein the controller detects both a preceding object located in the region forward of the vehicle and a side object located in the region on the side of the vehicle in response to a result of processing the forward-view image data, the forward-view sensing data, and the side-view sensing data, and
 in response to a collision between the vehicle and the preceding object being predicted and the region on the side of the vehicle being free of the side object, the controller outputs a steering signal to a steering device of the vehicle.

2. The driver assistance system (DAS) according to claim 1 wherein:
 in response to the collision between the vehicle and the preceding object being predicted after outputting the steering signal, the controller outputs a brake signal to a brake device of the vehicle.

3. The driver assistance system (DAS) according to claim 1, wherein:
 in response to the collision between the vehicle and the preceding object being predicted and the side object being detected, the controller outputs a brake signal to a brake device of the vehicle.

4. The driver assistance system (DAS) according to claim 1, wherein:
 in response to the collision between the vehicle and the preceding object being predicted and collision between the vehicle and the side object being predicted, the controller outputs a brake signal to a brake device of the vehicle.

5. The driver assistance system (DAS) according to claim 1, wherein:
 in response to the collision between the vehicle and the preceding object being predicted and the region on the side of the vehicle being free of the side object, the controller outputs the steering signal to the steering device of the vehicle to change a traveling direction of the vehicle to another direction that is free of the side object.

6. The driver assistance system (DAS) according to claim 1, wherein:
 in response to the result of processing the forward-view image data, the forward-view sensing data, and the side-view sensing data, the controller determines both a distance between the vehicle and the preceding object and a relative speed of the preceding object with respect to the vehicle.

7. The driver assistance system (DAS) according to claim 6, wherein the controller predicts a possibility of collision between the vehicle and the preceding object based on the distance between the vehicle and the preceding object and the relative speed of the preceding object with respect to the vehicle.

8. The driver assistance system (DAS) according to claim 1, wherein the controller is configured to determine whether the region on the side of the vehicle is free of the side object, and to output the steering signal to the steering device of the vehicle only when the region on the side of the vehicle is determined to be free of the side object.

9. The driver assistance system (DAS) according to claim 1, wherein the controller is configured to determine whether at least one of a right side region of the vehicle and a left side region of the vehicle is free of objects and to output the steering signal to the steering device of the vehicle to change the traveling direction of the vehicle towards the at least one side region of the vehicle determined to be free of objects.

10. A driver assistance method comprising:
 acquiring forward-view image data of a vehicle by a camera mounted to the vehicle and having a field of view (FOV) including a region forward of the vehicle;
 acquiring forward-view sensing data of the vehicle by at least one of a forward-view radar or a forward-view Light Detection And Ranging (LiDAR) sensor mounted to the vehicle and having a field of sensing (FOS) including the region forward of the vehicle;

acquiring side-view sensing data of the vehicle by at least one of a corner radar or a corner LiDAR mounted to the vehicle and having a field of sensing (FOS) including a region on a side of the vehicle;

processing the forward-view image data, the forward-view sensing data, and the side-view sensing data to detect both a preceding object located in the region forward of the vehicle and a side object located in the region on the side of the vehicle; and in response to a collision between the vehicle and the preceding object being predicted and the region on the side of the vehicle being free of the side object, changing a traveling direction of the vehicle to another direction.

11. The driver assistance method according to claim 10, further comprising:

in response to the collision between the vehicle and the preceding object being predicted after changing the traveling direction of the vehicle to the other direction, performing braking of the vehicle.

12. The driver assistance method according to claim 10, further comprising:

in response to the collision between the vehicle and the preceding object being predicted and the side object being detected, performing braking of the vehicle.

13. The driver assistance method according to claim 10, further comprising:

in response to the collision between the vehicle and the preceding object being predicted and a collision between the vehicle and the side object being predicted, performing braking of the vehicle.

14. The driver assistance method according to claim 10, wherein the changing the traveling direction of the vehicle includes:

changing the traveling direction of the vehicle towards a side direction that is free of the side object.

15. The driver assistance method according to claim 10, wherein the predicting of the collision between the vehicle and the preceding object includes:

determining a distance between the vehicle and the preceding object and a relative speed of the preceding object with respect to the vehicle.

16. The driver assistance method according to claim 15, wherein the predicting of the collision between the vehicle and the preceding object further includes:

predicting a possibility of collision between the vehicle and the preceding object based on the distance between the vehicle and the preceding object and the relative speed of the preceding object with respect to the vehicle.

17. A driver assistance system (DAS) comprising:

a first forward-view sensor including an image sensor mounted to a vehicle, having a field of view (FOV) including a forward direction of the vehicle, and configured to acquire forward-view image data;

a second forward-view sensor comprising at least one of a radar sensor or a Light Detection And Ranging (LiDAR) sensor, mounted to the vehicle, having a field of sensing (FOS) including the forward direction of the vehicle, and configured to acquire forward-view sensing data;

a corner sensor comprising at least one of a radar sensor or a LiDAR sensor, mounted to the vehicle, having a field of sensing (FOS) including a side direction of the vehicle, and configured to acquire side-view sensing data; and a controller provided with a processor configured to process the forward-view image data, the forward-view sensing data, and the side-view sensing data, wherein the controller is configured to detect both a preceding object located in the forward direction of the vehicle and a side object located in the side direction of the vehicle based on processing of the forward-view image data, the forward-view sensing data, and the side-view sensing data, and in response to a collision between the vehicle and the preceding object being predicted and no collision between the vehicle and the side object being predicted, the controller outputs a steering signal to a steering device of the vehicle.

18. The driver assistance system (DAS) according to claim 17, wherein:

in response to the collision between the vehicle and the preceding object being predicted and a collision between the vehicle and the side object being predicted, the controller outputs a brake signal to a brake device of the vehicle.

19. The driver assistance system (DAS) according to claim 17 wherein:

in response to the collision between the vehicle and the preceding object being predicted and no side object being detected in the side direction of the vehicle, the controller outputs to a steering device of the vehicle a steering signal to change a traveling direction of the vehicle to another direction in which no side object is detected.

20. The driver assistance system (DAS) according to claim 17, wherein:

in response to a result of processing the forward-view image data, the forward-view sensing data, and the side-view sensing data, the controller determines a distance between the vehicle and the preceding object and a relative speed of the preceding object with respect to the vehicle, and predicts a possibility of collision between the vehicle and the preceding object based on the distance between the vehicle and the preceding object and the relative speed of the preceding object.

21. A driver assistance system (DAS) for a vehicle having a steering system, comprising:

a forward-view sensor mounted to the vehicle and configured to sense a region forward of the vehicle and provide forward-view sensing data;

a side-view sensor mounted to the vehicle and configured to sense a region on a side of the vehicle and provide side-view sensing data; and a processor communicatively connected to the forward-view sensor and the side-view sensor to receive both the forward-view sensing data and the side-view sensing data, wherein the processor is configured to output a steering signal for the steering system of the vehicle in response to detecting a preceding object in the region forward of the vehicle based on the forward-view sensing data and detecting an area free of a side object in the region on the side of the vehicle based on the side-view sensing data.

22. The driver assistance system (DAS) of claim 21, wherein:

the forward-view sensor mounted to the vehicle comprises at least one of an image sensor, a radar sensor, or a Light Detection And Ranging (LiDAR) sensor configured to sense the region forward of the vehicle and provide the forward-view sensing data, and the side-view sensor mounted to the vehicle comprises at least one of a radar sensor or a Light Detection And Ranging (LiDAR) sensor configured to sense the region on the side of the vehicle and provide the side-view sensing data.

23. The driver assistance system (DAS) of claim 22, wherein:

the forward-view sensor mounted to the vehicle comprises the image sensor and at least one of the radar sensor or the Light Detection And Ranging (LiDAR) sensor, and the forward-view sensor is configured to sense the region forward of the vehicle and provide both image sensing data and radar or LiDAR sensing data as the forward-view sensing data, and the processor is configured to detect the preceding object in the region forward of the vehicle based on the image sensing data and the radar or LiDAR sensing data.

24. The driver assistance system (DAS) of claim 22, wherein the processor is further configured to output a braking signal for a braking system of the vehicle to decelerate the vehicle in response to detecting the preceding object in the region forward of the vehicle based on the forward-view sensing data and detecting a side object in the region on the side of the vehicle based on the side-view sensing data.

25. The driver assistance system (DAS) of claim 22, wherein the processor is further configured to determine a time to collision (TTC) or a distance to collision (DTC) measure relative to the detected preceding object based on the forward-view sensing data, and to output the steering signal for the steering system of the vehicle in response to determining that the TTC or the DTC falls below a predetermined value.

\* \* \* \* \*